April 27, 1965

G. K. HAUSE 3,180,444

VEHICLE WHEEL DRIVING AND BRAKING AND BRAKE
COOLING SYSTEM AND METHOD

Filed Feb. 19, 1963

INVENTOR.
GILBERT K. HAUSE

BY D. D. McGrew

ATTORNEY

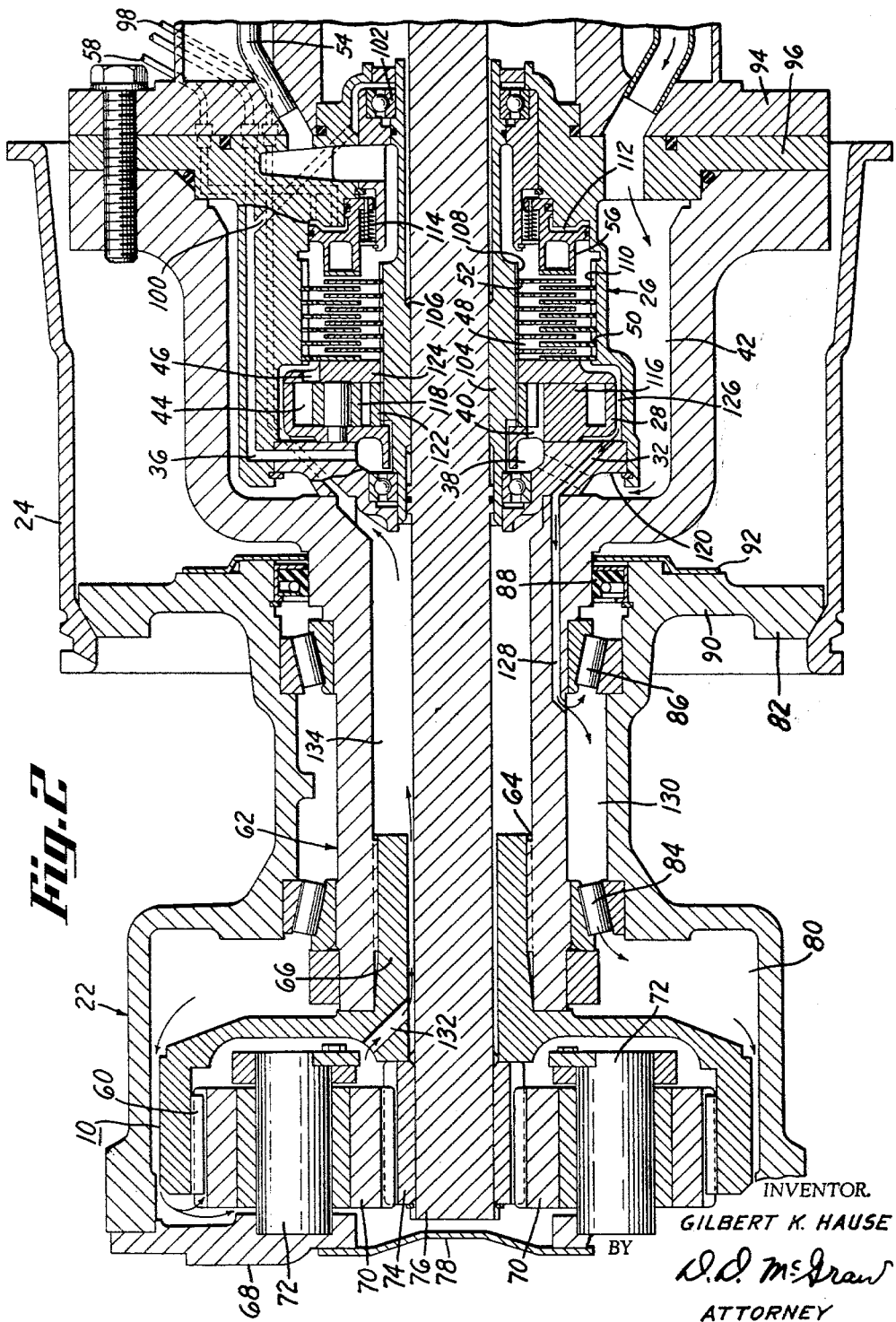

United States Patent Office 3,180,444
Patented Apr. 27, 1965

3,180,444
VEHICLE WHEEL DRIVING AND BRAKING AND BRAKE COOLING SYSTEM AND METHOD
Gilbert K. Hause, Bloomfield Hills, Mich., assignor to General Motors Corporation, Detroit, Mich., a corporation of Delaware
Filed Feb. 19, 1963, Ser. No. 259,532
9 Claims. (Cl. 180—75)

The invention relates to a vehicle wheel driving and braking system including means and method for cooling and lubricating portions thereof. It more particularly relates to a vehicle wherein the driving wheels thereof are driven through reduction gearing. Vehicles capable of utilizing structure of this type are common in large off-the-road machinery such as loaders, scrapers, large trucks, etc. of the types commonly classified as earth moving equipment. Other specialized vehicles may also use such a construction when it is desired to have low wheel r.p.m. due to the large diameter of the vehicle wheels and the relatively slow speeds at which the vehicles often operate. By utilizing a reduction gear system such as a planetary gear arrangement, the drive shafts of the driving wheels can rotate at a considerably higher speed. This makes it possible to attach the brakes to the relatively high speed wheel input shaft and consequently reduce them in diameter to a reasonable size as compared to the large diameter brakes required to obtain satisfactory braking directly on the wheel at low wheel speeds. It is also preferable to utilize disk type brakes on such applications due to their increased brake capacity in comparison to their overall diameter. It becomes desirable to provide a positive cooling system for such disk brake packs. As in other gear type constructions it is also necessary to lubricate the reduction gears. The invention provides a system wherein the brake packs are fluid cooled, with a portion of the cooling fluid also being routed to lubricate the wheel reduction gearing and then conducted into a reservoir, while the major portion of the cooling fluid is routed through a heat exchanger after removing heat from the brake pack. The cooled fluid from the heat exchanger is then delivered to the fluid pump inlet as is fluid from the reservoir. It is advantageous to provide a wheel input drive shaft driven pump associated with each wheel and brake pack and reduction gear combination. It is desirable that the fluid pump continue to deliver fluid through the brakes after brake release for after-cooling. In accordance with the invention this flow is obtained at all times when the wheels are being driven and a continuous flow of fluid for lubricating portions is also delivered to the reduction gear for the wheel. The lubricating fluid is preferably delivered to the reduction gear through a restriction so that its ratio by volume to the fluid in the reduction gear area has little temperature effect on the fluid serving as a lubricating fluid during braking. It is advantageous to connect the reduction gear lubricant supply so that it receives lubricating fluid from the positive pressure side of the pump rather than positioning it at the suction side of the pump since it would otherwise be possible, with quick brake applications, to have a momentary depression of pressure due to pump capacity, thereby allowing air to be pulled into the system past the edges of the rotating seals.

In the drawings:

FIGURE 1 is a schematic presentation of a system embodying the invention and utilizing the inventive method in a vehicle having a pair of driving wheels.

FIGURE 2 is a cross-section view of a wheel driving and braking assembly showing the provisions for pumping fluid, cooling and lubricating the brake and wheel drive gearing, and conducting the fluid to and from the reservoir and heat exchanger, as well as means for applying the brake.

The schematic system of FIGURE 1 includes a left drive wheel gear assembly 10 and a right drive wheel gear assembly 12. A common cooling and lubricating fluid reservoir 14 is provided, as is a common master cylinder 16 suitably connected to a brake pedal 18 for actuating and releasing the vehicle brakes. The fluid systems for each of the wheels receive fluid from the reservoir 14 through the common fluid conduit 20. Other portions of the system are provided for each wheel and in the diagram are illustrated in mirror image relationship. The following description will be related to the left wheel system with the same reference characters being utilized for similar elements in the right wheel system. The detailed illustration of FIGURE 2 shows a typical left wheel installation.

The reduction gear assembly 10 is a part of an entire left wheel driving and braking assembly 22 which includes the wheel 24, the brake unit 26, the fluid pump 28, and the associated conduits and passages. Each wheel assembly 22 may also be provided with a heat exchanger 30, or a common heat exchanger for a plurality of wheel assemblies may be provided. The restriction 32 schematically illustrated as being in the passage 34 connecting the brake unit 26 and the reduction gear assembly 10 may be provided by suitable orifice construction as illustrated in FIGURE 2.

Fluid from the reservoir 14 passes through the conduit 20 into conduit branch 36 to a passage 38 in fluid connection with the inlet 40 of the pump 28. Fluid from the heat exchanger 30 flows through passage means 42 to the passage 38 and then the pump inlet 40. The pump outlet 44 is connected by passage means 46 to the disk brake chamber 48. Fluid is moved under pressure through chamber 48 and through the stationary disks 50 and the rotating disks 52. As shown in FIGURE 1, fluid from the disk brake unit 26 flows in passage 34 through the restriction 32 to lubricate the reduction gear assembly 10. Fluid from the disk brake unit 26 also flows through the passage 54 to the heat exchanger 30. A brake apply piston 56 is positioned in conjunction with the disks 50 and 52 so that when it is actuated by apply pressure through conduit 58 under pressurizing action of the master cylinder 16, the disks are engaged and the brake is applied.

Referring more particularly to FIGURE 2, the reduction gear assembly 10 is illustrated as a planetary gear unit including a stationary ring gear 60 which is attached to the housing 62 by the splines 64 on the ring gear hub 66. Ring gear 60 therefore is the reaction member or reaction input element for the planetary gear input. The gear assembly 10 includes an output carrier 68 on which planetary gears 70 are rotatably mounted by suitable means such as pins 72. An input sun gear 74 engages planetary gears 70 and is secured to the wheel drive shaft 76 through which driving power for the wheels is delivered. A cover 78 is provided over the center portion of carrier 68 which seals the lubricating chamber 80 in which the gear assembly 10 is received. Chamber 80 is defined by a portion of the ring gear 60, the output carrier 68 with its cover 78, and the interior of a portion of the wheel mounting and supporting member 82. Member 82 is rotatably supported on housing 62 by bearings 84 and 86. Chamber 80 is connected with the bearings 84 and 86 so that they are also lubricated and a seal 88 is provided between housing 62 and the wheel mounting and support member 82.

Member 82 has a flange 90 extending radially outward on which the wheel 24 is suitably mounted. A fluid baffle 92 is also provided on flange 90 adjacent seal 88 to prevent the entry of dirt and dust.

Assuming the driving wheels to be connected to a rear axle, housing 62 may be considered to be the rear axle housing. A center housing section 94 is secured to the inner end of housing 62 with a brake and pump housing 96 being suitably mounted therebetween so that brake unit 26 is contained within the inner end of housing 62. Conduit 36 includes a suitable passage formed in housing 96 to which conduit sections are provided to connect passage 36 with the reservoir 14, not shown in FIGURE 2. Similar passages are provided which form portions of conduit 58 for the brake apply fluid and portions of conduit 98 which returns fluid from the reduction gear assembly 10 to the reservoir 14. A similar provision is also made for conduit 54. A conduit 100 may be formed as a passage in housing 96 which extends to lubricate bearing 102 intermediate the housing 96 and a hollow shaft 104. Shaft 104 is splined by splines 106 to drive shaft 76, with shaft 76 extending concentrically through the hollow shaft.

Shaft 104 forms the inner wall of chamber 48 and is provided with splines 108 on its outer surface by which the rotatable brake disks 52 are driven. Internal splines 110 are provided on the inner surface of housing 96 by which the stationary brake disks 50 are held in place. The brake apply piston 56 is reciprocably mounted in housing 96 so that the brake apply chamber 112 is connected with conduit 58 and sealed from chamber 48. Piston return springs 114 are also provided to retract the piston upon release of the brake pedal 18 to release the brake pack 26.

A pump housing 116 acts as a carrier for a pump driven gear 118 and extends about hollow shaft 104 adjacent one end of the brake pack 26. The pump housing is retained in position by the housing wall 120 of housing 96 and cooperates therewith to form the passage 38. The pump drive gear 122 is spline-connected to hollow shaft 104 so as to be driven thereby. The side 124 of the housing 116 acts as a rotating pressure plate for the disk pack 26. Passage 46 is provided in housing 116 at the pump discharge area and is fluid connected to chamber 48. It is also fluid connected by the annular space 126 between housing 116 and housing 96 to the restriction 32 which is formed as a restricted passage extending through housing wall 120 and connecting with passage 128 in housing 62 to conduct fluid in a restricted flow condition from pump 28 to the chamber 130 intermediate bearings 84 and 86. This fluid flows through bearing 84 and into the lubricant chamber 80. Chamber 80 acts as an accumulator for lubricant fluid which flows around the outer part of ring gear 60 and through the planetary gear to passage 132 and then through the inner portion of hub 66 around drive shaft 76 to the inner chamber 134 which is connected with conduit 98 leading to reservoir 14.

In operation of the system, wheel 24 is driven at a reduced speed by shaft 76 through gear assembly 10. Shaft 76 drives hollow shaft 104 with which brake disks 52 and pump drive gear 122 rotates. The pump inlet 40 receives fluid from the reservoir 14 through conduit 36 and passage 38 and pressurizes the fluid, discharging it through outlet 44 and passage 46. The fluid passes between the disks 50 and 52 and into passage 54 leading to the heat exchanger 30. It is discharged from the heat exchanger 30 to passage 42 by which it is returned to the pump inlet 40. A restricted amount of the fluid discharged from pump 28 is delivered to the lubricant accumulator chamber 80, through the gear assembly 10 and then to the reservoir 14 through the conduit 98. Thus so long as the wheel 24 is being driven, lubrication is being continuously provided to the gear assembly 10. When the operator applies the vehicle brakes by actuation of brake pedal 18, the disks 50 and 52 are engaged in braking relation by movement of piston 56. Heat is generated in the braking unit and the fluid flowing through chamber 48 to passage 54 removes heat from the disks. This heat is in turn removed from the fluid and the cooling fluid is returned to the pump inlet. The fluid being routed through restriction 32 may be fluid which has passed through the brake pack, as illustrated schematically in FIGURE 1, or may be fluid which is taken from the pump discharge before it has passed through the brake pack. In either instance, however, there may be some heat in the fluid which is removed from the brake pack during and for a time after brake actuation. However, due to the accumulating effect of chamber 80 and the restrictive effect of orifice 32 the amount of heated fluid routed to the gear assembly 10 is such that the effective temperature rise of the lubricating fluid is negligible and the fluid can be returned directly to the reservoir without requiring it to be passed through the heat exchanger.

The system and method embodying the invention provides positive lubrication to the planetary gear area so that there is no likelihood of pulling atmospheric air through the rotational seal 88 due to evacuating action of a pump. A continued fluid flow is provided for aftercooling of the brake as well as for continuous wheel drive gear assembly lubrication while providing negligible temperature effects on the lubricant section of the system during braking action. A relatively small brake pack of sufficient brake capacity is provided by installing the brake pack on a higher speed portion of the vehicle drive line while maintaining independent wheel brakes for each of the driving wheels.

What is claimed is:

1. A vehicle braking system for a vehicle wheel having a planetary wheel drive, said system comprising a disk pack for operatively braking said wheel, a cooling fluid pump driven by the planetary wheel drive input, a cooling fluid reservoir having conduit means connected to the inlet of said pump, passage means conducting pressurized cooling fluid from said pump to said disk pack, a heat exchanger in fluid conection with said disk pack and receiving cooling fluid therefrom and returning cooling fluid to said pump inlet, restricted flow conduit means for conducting cooling fluid from said disk pack to the planetary wheel drive, conduit means for returning fluid from the planetary wheel drive to said reservoir, and means for energizing said disk pack to operatively brake the wheel.

2. A vehicle wheel driving and braking system having a brake cooling and wheel drive lubricating circuit and a cooling fluid heat exchanger circuit and a brake apply circuit, said braking and driving system comprising: a planetary gear wheel drive having a sun gear input and a planetary gear carrier output member and a ring gear reaction member and a wheel drivingly secured to said carrier output member; a disk brake pack having at least one stationary disk operatively secured to said reaction member and at least one rotatable disk operatively secured to said sun gear input member; said brake cooling and wheel drive lubricating circuit comprising a cooling pump operatively driven by said sun gear input member and discharging cooling fluid to and through said disk brake pack, conduit means having a restriction therein and conducting cooling fluid from said disk brake pack through said planetary gear drive, a cooling fluid reservoir, conduit means returning cooling and lubricating fluid from said planetary gear drive to said reservoir, and further conduit means fluid connecting said reservoir with the inlet of said pump; said cooling fluid heat exchanger circuit comprising conduit means receiving fluid from said disk brake pack, a heat exchanger connected therewith, and additional conduit means connecting said heat exchanger with the inlet of said cooling pump.

3. A wheel drive and lubricating and braking and brake cooling arrangement comprising: a housing, a wheel mounting member rotatably mounted on said housing, a planetary gear wheel drive having a stationary ring gear secured to said housing and an output carrier drivingly secured to said wheel mounting member and an input sun gear, a wheel drive shaft operatively journalled in said housing and connected to drive said sun gear, a disk brake having stationary disk means secured to said housing and rotatable disk means operatively secured to said wheel drive shaft and means for controllably engaging said disk means to apply a braking force to said wheel drive shaft and through said planetary gear wheel drive to said wheel mounting member, a cooling and lubricating fluid pump drivingly connected to be operably driven by said wheel drive shaft and having a fluid inlet and a fluid discharge, passage means connecting said pump fluid discharge to flow cooling to and through said disk means, first conduit means having a restriction therein and connected with said pump fluid discharge to conduct cooling and lubricating fluid through said planetary gear wheel drive, second conduit means receiving cooling and lubricating fluid from said planetary gear drive, a fluid reservoir receiving fluid from said second conduit means, third conduit means connecting said fluid reservoir with said pump fluid inlet, a lubricating and cooling fluid heat exchanger, fourth conduit means connected to said disk brake to receive fluid passed through and cooling said disk brake disk means and conducting the same to said heat exchanger, and fifth conduit means conducting cooled fluid from said heat exchanger to said pump inlet.

4. In a vehicle driving and braking system, a driving wheel having a reduction gear drive including a high speed input and a low speed output on which said wheel is operatively mounted, brake means for braking said high speed input, means including fluid and a fluid circuit for cooling said brake means and for lubricating said reduction gear drive in series fluid flow relation, and means including a fluid circuit having a heat exchanger in series fluid flow relation with said brake means and in parallel fluid flow relation with said reduction gear drive for cooling said fluid after said fluid has cooled said brake means.

5. The system of claim 4, said cooling and lubricating fluid circuit having a fluid accumulator chamber associated with said reduction gear drive and orifice means intermediate said brake means and said chamber for limiting the flow of fluid having a temperature differential due to braking action.

6. A vehicle wheel driving and braking assembly comprising, a housing, a wheel drive and support member rotatably mounted on said housing, a reduction drive assembly for said wheel drive and support member including a reaction input element secured to said housing and an output element secured to said wheel drive and support member and an input element, a power transmitting member drivingly connected to said input element and received in said housing, brake means between said power transmitting member and said housing for applying a braking force to said wheel drive and support member through said reduction drive assembly, a cooling and lubricating fluid pump in said housing drivingly connected to be driven by said power transmitting member, passage means for conducting fluid from said pump through said brake means and said reduction drive assembly, and heat exchanging means fluid connected with said brake means for cooling fluid therefrom independently of fluid passing through said reduction drive assembly.

7. A vehicle wheel driving and braking assembly comprising a pair of wheels each of which is driven by a reduction gear drive with each of said drives having an input shaft, braking means on each of said shafts and a brake actuating system for actuating said braking means to obtain wheel braking action through said reduction gear drive, a combined brake cooling and reduction gear drive lubricating system including a cooling and lubricating fluid pump driven by each of said drive shafts and receiving fluid from a reservoir, means delivering fluid from said pumps to said brake means associated therewith to remove heat therefrom, a lubricating fluid circuit for each of said reduction gear drives operatively receiving fluid from the pump associated therewith and transmitting the fluid through the associated reduction gear drive and returning it to said reservoir, and a cooling fluid circuit for each of said brake means receiving fluid from said pump after the fluid has passed through said brake means and been heated thereby and including heat exchanging means for cooling the heated fluid and conduit means returning the cooled fluid to said pump.

8. The method of cooling a heat generating unit and lubricating a mechanism mechanically interconnected with said heat generating unit by use of a common fluid, said method comprising the steps of pumping cooling and lubricating fluid adjacent to and through the heat generating unit and transferring heat therefrom to the fluid, receiving a portion of the fluid delivered adjacent to the heat generating unit and transmitting the same to lubricate the mechanically interconnected mechanism, returning the fluid from the mechanically interconnected mechanism to the fluid pump, receiving other fluid heated by the heat generating unit to remove heat therefrom and returning the resultant cooled fluid to the pump, and pumping the combined fluids to the heat generating unit to repeat the cycle, the fluid passing through the mechanically interconnected mechanism being pumped thereto by bypassing the heat generating unit.

9. The method of lubricating a drive gear mechanism and cooling a brake interconnected with said drive gear comprising the steps of pumping cooling and lubricating fluid adjacent to and through the brake and transferring heat therefrom to the fluid to cool the brake, receiving a portion of fluid delivered adjacent to the brake and transmitting the same to the gear mechanism to lubricate the gear mechanism by bypassing the brake so that no brake heat is transmitted to the bypassed fluid before it lubricates the gear mechanism, returning the portion of fluid from the gear mechanism to the fluid pump, passing another portion of fluid from the brake which has been heated by the brake through a heat exchanging unit to remove heat therefrom and returning the resultant cooled another portion of fluid to the pump, and pumping the combined fluids to the brake to repeat the cycle.

References Cited by the Examiner
UNITED STATES PATENTS

| | | |
|---|---|---|
| 2,750,018 | 6/56 | Dundore. |
| 2,833,385 | 5/58 | Peterson et al. |
| 2,884,813 | 5/59 | Kelley. |
| 3,039,327 | 6/62 | Breting. |
| 3,053,051 | 9/62 | Kelley. |

A. HARRY LEVY, *Primary Examiner.*